United States Patent Office 3,600,417
Patented Aug. 17, 1971

3,600,417
METHOD OF REMOVING SECONDARY ALUMINUM ALKOXIDES FROM PRIMARY ALUMINUM ALKOXIDES
Allan J. Lundeen and James E. Yates, Ponca City, Okla., assignors to Continental Oil Company, Ponca City, Okla.
Filed Oct. 21, 1968, Ser. No. 769,348
Int. Cl. C07f 5/06
U.S. Cl. 260—448AD                6 Claims

ABSTRACT OF THE DISCLOSURE

A method for removing secondary aluminum alkoxides from primary aluminum alkoxides by heating a mixture containing both types of compounds to selectively convert the secondary alkoxides to olefinic compounds without substantial molecular change of the primary alkoxide. The method is further developed to either remove from the mixture, the olefinic products of thermal decomposition of the secondary alkoxides, or, where such products are derived from dialuminum alkoxides containing both primary and secondary substitution of the alkyl group, to hydrolyze them to primary alcohols. In either procedure, the starting mixture is improved as a source material of alcohol sulfates useful as detergents.

BACKGROUND OF THE INVENTION

Field of the invention

This invention relates to a method for removing secondary aluminum alkoxides from a mixture of these materials with primary alkoxides, and more specifically, to a method for converting both these materials in situ to primary alcohols.

BRIEF DESCRIPTION OF THE BACKGROUND PROBLEM

A well known method for producing long chain alcohols entails an addition reaction in which an aluminum alkyl compound, such as aluminum triethyl, is reacted with ethylene. The length of the alkyl chain thereby undergoes "growth" by the incorporation of ethyl groups in the molecule. The so-called growth product is then oxidized to form the alkoxide, followed by hydrolysis to yield the alcohol. These long chain alcohols form a valuable source of detergent grade alcohol sulfates.

The alkoxide mixtures formed upon oxidation of the growth product yielded in the described ethylene addition reaction are known to consist predominantly of primary alkoxides characterized by varying chain lengths in which the number of carbon atoms present follow a Poisson distribution. There are also present in the oxidized growth product, however, a minor amount of free alcohol and a small amount of dialuminum alkoxides in which there is a secondary alkoxide substituent, as well as a primary alkoxide substituent. It has been generally accepted that diols, to which the dialuminum alkoxides are converted by hydrolysis, are responsible for an undesirable odor characteristic in growth product derived alcohol sulfates. It is therefore desirable to reduce the quantity of dialuminum alkoxide precursors of the odiferous alcohol sulfates.

SUMMARY OF THE PRESENT INVENTION

This invention is a method of removing secondary aluminum alkoxide from a mixture of these compounds with primary aluminum alkoxides, such a mixture being typified by the oxidized growth product resulting from the oxidation of ethylated aluminum alkyl compounds. In facilitating the removal of such secondary aluminum alkoxides from the mixture, the method therefore offers a solution to the problem of reducing odor in alcohol sulfates derived from such mixtures. Other useful applications of the method may also be envisioned.

Broadly described, the method of the invention comprises heating the mixture to selectively pyrolyze the secondary alkoxides and yield olefinic materials therefrom. The olefinic derivatives may then be removed from the mixture either by stripping, or by hydrolyzing them in situ to primary alcohols in instances where they are derived from dialuminum alkoxides. In this latter step, the primary alkoxides initially present in the mixture are, of course, simultaneously converted to primary alcohols. The mixture of primary alcohols thus produced may then be reacted with sulfur trioxide and neutralized to yield alcohol sulfates of improved odor.

The method of the invention is based on the discovery that secondary aluminum alkoxides undergo thermal decomposition at a much faster rate than primary alkoxides, and this difference in rates becomes more pronounced as the temperature to which the mixture is heated is decreased. In order to accomplish the pyrolysis of a substantial portion of the secondary alkoxide within a practical time period, however, it is preferred to heat the mixture to a temperature such that at least about 93 weight percent of the secondary alkoxide will be converted to olefin in about one hour (corresponding to a half life of about fifteen minutes). This will generally entail heating the mixture to a temperature of at least 300° C., and preferably to about 310° C.

An object of the invention manifest from the foregoing discussion is to provide a method for removing secondary alkoxides from a mixture of these materials with primary alkoxides.

Another object of the invention is to remove the precursors of malodorous alcohol sulfates from a mixture of aluminum alkoxides employed in the preparation of such sulfates.

A further object of the invention is to increase the yield of 1-alkanols derived from the oxidation and hydrolysis of aluminum alkyl compounds.

Yet another object of the invention is to provide a method for stabilizing primary aluminum alkoxides against thermal decomposition in the presence of free alcohol.

Additional objects and advantages of the invention will become apparent from the following detailed description of the invention considered in conjunction with the accompanying drawings.

DETAILED DESCRIPTION OF PREFERRED EMBODIMENTS OF THE INVENTION

Figure 1:
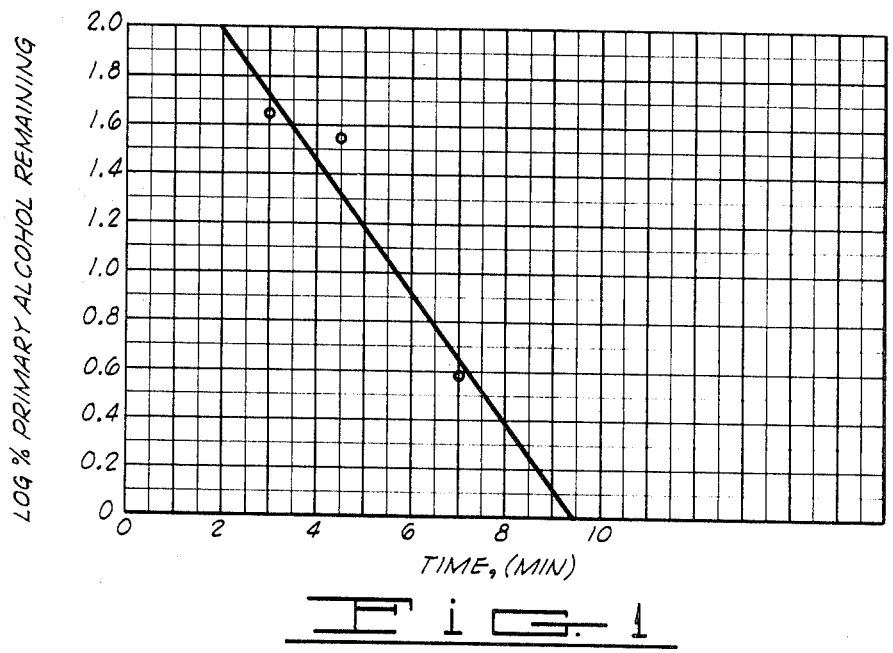
FIG. 1 is a graph in which the log of the percent of primary alkoxide undecomposed by pyrolysis is plotted against time.

As indicated above, the method of the present invention is based upon the determination that secondary aluminum alkoxides undergo thermal decomposition at a substantially faster rate than do the primary aluminum alkoxides. The products yielded by the pyrolysis of these materials are olefins and aluminum hydroxide, and the decomposition reaction may be represented as follows:

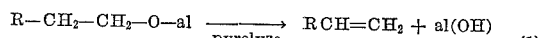

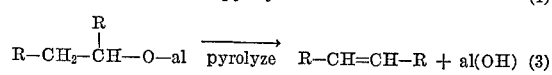

where R is an alkyl group, and al is ⅓ Al or represents the bonding of only one valence of the aluminum atom. If reaction (2) occurs at a much faster rate than reaction (1), then the predominantly formed internal olefinic product of pyrolysis of the secondary alkoxide can be removed from the composed primary aluminum alkoxide by a stripping or distillation procedure.

Of particular interest, in view of the utility of this method for converting secondary alkoxides to internal olefins, is the potential of the method for producing primary alcohols from dialuminum alkoxide compounds containing both the secondary and primary substituents. This derivation of primary alcohols is shown by the reaction sequence

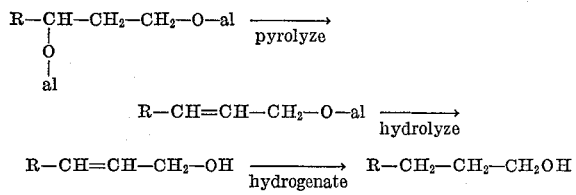

where R and al are defined as hereinbefore described. It is thus perceived that the dialuminum alkoxides are converted by pyrolysis to the olefinic precursors of primary alcohols. The latter materials are generally recognized as being less objectionable as source materials for alcohol sulfates than are the diols resulting from direct hydrolysis of the dialuminum alkoxides, since sulfates derived from such diols have an undesirable odor, whereas the primary alcohol-derived sulfates do not. In summary, then, the observed difference in the rates of thermal decomposition of secondary and primary aluminum alkoxides provides a basis for treating a mixture containing both primary alkoxides and dialuminum alkoxides of primary and secondary substitution to yield, following pyrolysis, a mixture which can be hydrolyzed to a product containing essentially only primary alcohols and thus having an enhanced value as a source of detergent grade alcohol sulfates.

The starting alkoxide mixture thus susceptible to treatment is readily available from the well known ethylene growth reaction process to which reference has been made. In applying the method of the invention to this "growth product" mixture, however, we have ascertained that free alcohol, which is present in minor amounts in the growth product, detrimentally increases the rate of thermal decomposition of the primary alkoxide relative to the rate of decomposition of the secondary alkoxide present so that the total yield of the desired primary alcohols is reduced. Moreover, the presence of free alcohol even in small amounts results in the undesirable production of by-product ethers from the alkoxides subjected to pyrolysis. We have further found, however, that the described deleterious effects of free alcohol can be avoided by the addition to the mixture of alkoxides and alcohol of at least about 2 weight percent of a relatively low molecular weight aluminum alkyl compound in which the aluminum atom is bonded to one or more alkyl groups containing from two to four carbon atoms. The aluminum alkyl employed is preferably either aluminum triethyl or aluminum diethyl hydride.

The following examples will serve to further illustrate various aspects of the invention, without restricting the invention to any specific parameter or process condition to which reference may be made therein.

Example 1

A mixture of 29.9 grams of aluminum triethyl in 60 ml. of benzene was added to 2.0 grams of 4-decanol and 128.3 grams of 1-dodecanol in 100 ml. of benzene. The mixture was held at benzene reflux temperature during the addition. Benzene was then distilled out and the alkoxide yielded in the reaction was stripped at 0.2 mm. Hg and 200–220° C. for four hours.

To determine the amount of alkoxides yielded in the reaction, a sample of the alkoxide product was hydrolyzed and the alcohol obtained upon hydrolysis was analyzed by gas-liquid partition chromatography. This analysis indicated that the alkoxide product, about 1.44 weight percent was the secondary alkoxide derived from 4-decanol, and the balance was the primary alkoxide derived from the 1-dodecanol. This corresponds approximately to the weight ratio of secondary aluminum alkoxide to primary aluminum alkoxide in oxidized growth product produced in the well known ethylene growth reaction to which reference has been made.

Several small samples of about 2 ml. each of the aluminum alkoxide mixture produced as described were each sealed in a 5 ml. glass ampule and immersed in a hot oil bath consisting of about 700 ml. of petroleum derived bright stock in a 1 liter flask. The flask was continuously purged with argon to exclude air. Each sample was allowed to heat for a specified length of time, and the oil bath was maintained at various temperatures. After heat treatment in this manner, each sample was then hydrolyzed with excess 6 molar HCl and analyzed for alcohol and olefin content by gas-liquid partition chromatography. The conditions and results of these pyrolysis runs are set forth in Table I.

TABLE I

| Run No. | Temp. (° C.) | Time (min.) | Analyses, wt. percent ||||
|---|---|---|---|---|---|---|
| | | | $C_{10}$ fraction (secondary alkoxide) || $C_{12}$ fraction (primary alkoxide) ||
| | | | Alcohol | Olefin | Alcohol | Olefin |
| 1 | 350 | 3.0 | 44.6 | 55.4 | 99.54 | 0.46 |
| | | 4.5 | 22.6 | 77.4 | 99.12 | 0.88 |
| | | 7.0 | 3.9 | 96.1 | 98.26 | 1.74 |
| 2 | 330 | 6.0 | 48.5 | 51.5 | 99.66 | 0.34 |
| | | 12.0 | 11.6 | 88.4 | 98.87 | 1.13 |
| | | 20.0 | 2.5 | 97.5 | 98.20 | 1.80 |
| 3 | 310 | 8.5 | 74.1 | 25.9 | 99.84 | 0.16 |
| | | 13.0 | 67.1 | 32.9 | 99.77 | 0.23 |
| | | 19.0 | 51.4 | 48.6 | 99.64 | 0.36 |
| | | 25.0 | 40.4 | 59.6 | 99.59 | 0.41 |
| | | 35.0 | 25.9 | 74.1 | 99.33 | 0.67 |
| | | 46.0 | 13.1 | 86.9 | 99.01 | 0.99 |

From the data shown in Table I, first order rate constants (K secondary) for the decomposition of the secondary alkoxide were calculated by plotting log of weight percent of unreacted alkoxide (alcohol) against time and drawing the best straight line through the points, as illustrated in FIG. 1 for the typical case of Run 1 carried out at 350° C.

Figure 2:
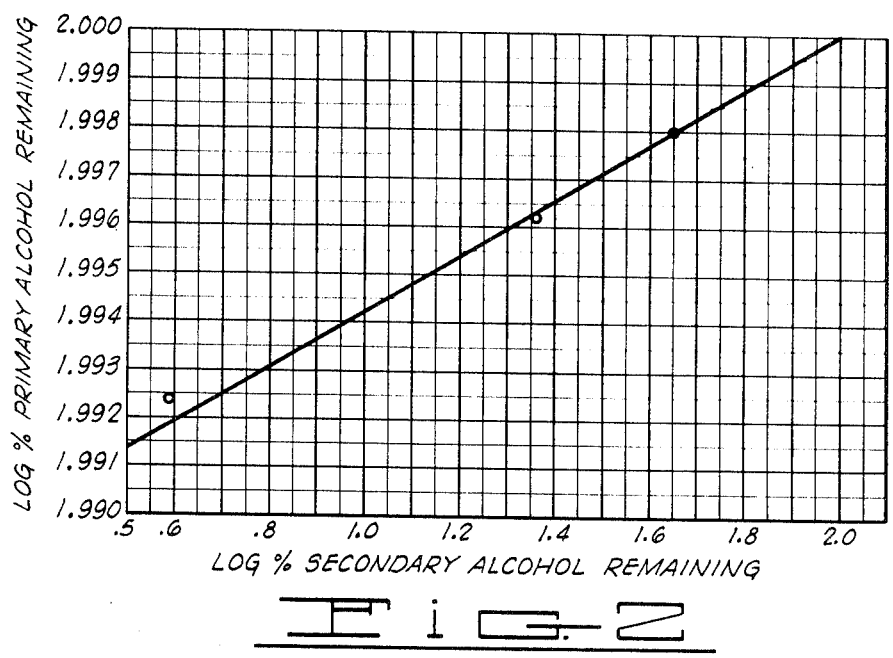
FIG. 2 is a graph in which the log of the percent of undecomposed secondary alkoxide is plotted against the log of the percent of undecomposed primary alkoxide.

There was also plotted the log of weight percent of undecomposed secondary alkoxide (alcohol) remaining against the log of weight percent of undecomposed primary alkoxide (alcohol) remaining, as exemplified by the plot of Run 1 in FIG. 2, and from this plot, the rate constant ratio $$\frac{K \text{ secondary}}{K \text{ primary}}$$

was calculated for each set of conditions. The various rate constants and rate constant ratios calculated are listed in Table II, which also shows the calculated thermal decomposition half-life of the secondary alkoxide at various temperatures.

TABLE II

| Run No. | Temp., ° C. | $K_{sec.}$ (min.$^{-1}$) | Half life of sec. (min.) | $K_{sec.}/K_{pri.}$ | Calcd. $K_{pri.}$ (min.$^{-1}$) |
|---|---|---|---|---|---|
| 1 | 350 | .61 | 1.1–1.2 | 175 | 35×10$^{-4}$ |
| 2 | 330 | .21 | 3.2–3.3 | 200 | 10.5×10$^{-4}$ |
| 3 | 310 | .045 | 15.4 | 210 | 2.2×10$^{-4}$ |

From the data set forth in Table II, the activation energies for the decomposition of the secondary and primary alkoxides were calculated as 47.5 Kcal. per mole and 51.5 Kcal. per mole, respectively. These activation energy values, and the rate constant ratio values clearly show that the secondary alkoxide undergoes thermal decomposition at a much faster rate than the primary alkoxide.

From the calculated half life values at various temperatures, it may be perceived that as the temperature at which the thermal decomposition is carried out is lowered, the half life of the secondary alkoxide increases, even though its rate of decomposition increases relative to the rate of decomposition of the primary alkoxide. Thus, at 310° C., the calculated half life of the secondary alkoxide is 15.4 minutes. This is equivalent to the decomposition of about 93 percent of the secondary alkoxide in a one hour period of time and, in the use of the process of the invention for eliminating a significant amount of the secondary alkoxide in order to provide a more acceptable precursor or starting material for use in the production of alcohol sulfates, this period of time for decomposing this amount of the alkoxide represents a fairly practical and therefore preferred time period to eliminate this quantity of the secondary alkoxide. In other applications of the process of the invention, it is preferred that the temperature be at least 300° C. in order that the time within which a significant portion of the secondary alkoxide can be decomposed will not be inordinate.

Example 2

In order to simulate the free alcohol containing aluminum alkoxide composition produced by the ethylene growth reaction in commercial usage, five samples were prepared which contained the mixture of alkoxides produced as described in Example 1, and which also each contained 5 weight percent of a mixture of $C_{12}$–$C_{16}$ normal alkanols. These samples were pyrolyzed for varying times at 310° C. in an oil bath as described in Example 1, then hydrolyzed, and finally were analyzed by gas-liquid partition chromatography. The results of this analysis are set forth in Table III.

TABLE III

| | Analyses, wt. percent | | | |
|---|---|---|---|---|
| | $C_{10}$ fraction | | $C_{12}$ fraction | |
| | (Secondary alkoxide) | | (primary alkoxide) | |
| | Alcohol | Olefin | Alcohol | Olefin |
| Time (min.): | | | | |
| 30 | 44.7 | 55.3 | 99.43 | 0.57 |
| 45 | 29.8 | 70.2 | 90.12 | 0.86 |
| 60 | 22.0 | 78.0 | 98.80 | 1.20 |
| 80 | 14.7 | 85.3 | 97.76 | 2.24 |
| 105 | 12.4 | 87.6 | 95.96 | 4.04 |

A comparison of Table I and Table III clearly indicates that the relative rate of thermal decomposition of secondary and primary alkoxides is detrimentally affected by the presence of free alcohol in the alkoxide mixture.

Example 3

Two samples of the alkoxide mixture produced as described in Example 1 were pyrolyzed at 310° C., then hydrolyzed and analyzed by gas-liquid partition chromatography for didodecyl ether content. Three samples prepared as described in Example 2 (to contain 5 weight percent $C_{12}$–$C_{16}$ normal alkanols) were also pyrolyzed at 310° C., hydrolyzed and analyzed for didodecyl ether. The results obtained, as set forth in Table IV, indicate that the presence of free alcohol in the alkoxide mixture results in an increase in the formation of ether in the course of pyrolysis—an undesirable result where the alkoxide mixture is to be used as the starting material in the production of either primary alcohols, or sulfates derived from such alcohols.

TABLE IV

| Sample | Pyrolysis time (minutes) | Didodecyl ether content (percent of $C^{12}$ alkoxides) |
|---|---|---|
| Alkoxide mixture containing free alcohol | 60 | 0.6 |
| | 80 | 3.2 |
| | 105 | 7.5 |
| Alkoxide mixture containing no alcohol | 60 | 0.3 |
| | 105 | 1.6 |

Example 4

A mixture of aluminum alkoxides prepared by oxidizing the growth product derived from the previously described ethylene growth reaction contained about 1 weight percent free alcohol, about 1 weight percent secondary aluminum alkoxides, about 0.7 weight percent dialuminum alkoxides (primary and secondary substitution) and the balance primary aluminum alkoxides. The alkoxides contained an average of about 9 carbon atoms per alkyl group. About 2 ml. of the described alkoxide mixture were sealed in a glass ampule and heated in an oil bath for 1 hour at 310° C. It was then hydrolyzed and chromatographically analyzed with the following results:

Component: Weight percent
$C_4$–$C_{18}$ alcohols + $C_{18}$–$C_{24}$ ethers [1] _____ 84
$C_6$–$C_{16}$ ethers _____ 9
$C_4$–$C_{18}$ olefins _____ 5
Unknowns _____ 2

[1] The $C_{18}$–$C_{24}$ ethers are not resolved from the $C_4$–$C_{18}$ alcohols but are known to be present in an amount larger than the $C_6$–$C_{16}$ ethers.

Example 5

To a small sample of the growth product alkoxide mixture described in Example 4 was added .019 gram of aluminum triethyl per gram of alkoxide. The sample was pyrolyzed and hydrolyzed in the identical manner as the sample pyrolyzed in Example 4, and was then analyzed by gas liquid partition chromatography. This analysis showed that about 1.2 weight percent of olefin was present with only very minor amounts of ethers and unknowns. These results indicated that the use of about 2 weight percent aluminum triethyl effectively stabilized the mixture against decomposition of the primary alkoxide by the free alcohol present.

Example 6

Three samples, each of approximately 1000 gram of a plant produced alkoxide mixture (oxidized growth product) having the composition described in Example 4 were stabilized with aluminum triethyl and heated to 310° C., and the samples were then stripped at 250–260° C. and p. 1–0.5 mm. Hg. Experimental data for these runs are shown in Table V.

TABLE V

| | Pyrolysis time, min. | Aluminum triethyl, wt. percent of alkoxide | Overhead on stripping wt. percent of alkoxide |
|---|---|---|---|
| Run: | | | |
| 1 | 60 | 2.25 | 1.75 |
| 2 | 30 | 2.05 | 3.9 |
| 3 | 30 | 2.05 | 4.6 |

The stripped alkoxide was hydrolyzed in about 2 liters of 22 percent $H_2SO_4$. The crude alcohol obtained was washed with 200 ml. of water, then with two 65 ml. portions of 5 percent NaOH, and again with two 1 liter portions of water. The alcohol product of each run was fractionated by distillation to yield a predominantly $C_{12}$–$C_{14}$ fraction which was then chromatographically analyzed and evaluated for sulfate odor. A control sample constituting a $C_{12}$–$C_{14}$ alcohol fraction derived from the same alkoxide plant mixture, but which had not been subjected to pyrolysis followed by stripping, was then similarly analyzed and evaluated. The results of the analysis and evaluation are shown in Table VI.

TABLE VI

| Component | Weight percent by GLPC | | | |
|---|---|---|---|---|
| | Control | Run 1 | Run 2 | Run 3 |
| Pre $C_{10}OH$ | 0.2 | 0.8 | 0.2 | 0.2 |
| $C_{10}OH$ | 6.3 | 5.7 | 4.1 | 4.1 |
| Pre $C_{12}OH$ | 1.3 | 1.2 | 0.8 | 0.8 |
| $C_{12}OH$ | 57.2 | 52.0 | 58.2 | 59.0 |
| Pre $C_{14}OH$ | 1.0 | 0.4 | 0.6 | 0.4 |
| $C_{14}OH$ | 33.8 | 35.0 | 36.0 | 35.6 |
| Post $C_{14}OH$ | 0.1 | | 0.1 | |
| Sulfate odor | (1) | (2) | (3) | (2) |

1 Pronounced.
2 Moderate.
3 Different odor.

The tabulated results indicate that the pyrolysis treatment effectively reduces the secondary alkoxide precursors of the malodorous alcohol sulfates. The analyses also indicate that pyrolysis reduces to some extent the amount of total impurities present in the alcohols yielded upon hydrolysis (which are represented by the pre-$C_{12}OH$ and pre-$C_{14}OH$ peaks on the chromatograph).

Example 7

Several samples of the plant produced aluminum alkoxide mixture referred to in Example 4 were stabilized with various amounts of aluminum triethyl. The samples were sealed in glass ampules and heated to 310° C. for 1 hour. The pyrolyzed alkoxide was then hydrolyzed and analyzed for olefins and ethers. The results are tabulated in Table VII.

TABLE VII

| Sample: | Wt. percent, stabilizer | Product analysis, wt. percent | |
|---|---|---|---|
| | | Olefin | Ether and unknowns |
| 1 | 3.5 | 1.2 | Minor amount. |
| 2 | 2.0 | 1.6 | Do. |
| 3 | 1.0 | 5-6 | Extensive amount. |
| 4 | 0.5 | 6 | Do. |

The results appearing in Table VII show that increasing the amount of aluminum triethyl in the mixture above about 2.0 weight percent does not appear to appreciably improve stabilization against the detrimental effects of the free alcohol present. At a concentration as low as 1 weight percent, however, the aluminum triethyl is not markedly effective in stabilizing oxidized growth product.

Example 8

1.25 grams of aluminum diethyl hydride was added to 49.1 grams of the plant-produced aluminum alkoxides described in Example 4. The sample was heated at 310° C. for 1 hour, hydrolyzed and analyzed as described in previous examples. The analysis showed 1.1 weight percent olefin formation with much lesser amounts of ethers and other products of instability.

Example 9

A number of samples of plant produced aluminum alkoxide growth product were heated to about 310° C. The several samples were withdrawn from the elevated temperature environment after varying periods of time. Each sample was then passed through a molecular still to remove any volatile materials present. Each sample was then divided into two portions with one portion being analyzed for aluminum, and the other portion being hydrolyzed in 25 percent $H_2SO_4$ followed by analysis for diol content. The results of the analysis are summarized in Table VIII.

TABLE VIII

| Run No.: | Time at 310° C., minutes | Diol, wt. percent | Aluminum, wt. percent |
|---|---|---|---|
| 1 | 0 | 0.4 | 6.07 |
| 2 | 6 | 0.3 | 6.14 |
| 3 | 12 | 0.25 | 6.24 |
| 4 | 20 | 0.09 | 6.32 |
| 5 | 30 | 0.09 | 6.42 |
| 6 | 40 | 0.09 | 6.73 |

The aluminum analysis reflects the extent of decomposition of the primary alkoxide. Thus, the data show, when using Run 1 as the base level, that after 20 minutes, about 75 weight percent of the diol was decomposed, and about 3 weight percent of the primary alkoxide was decomposed. After 40 minutes, the decomposition of the diol was still about 75 weight percent, with about 10 weight percent decomposition of the primary alkoxide. While these data do not illustrate the optimum conditions for carrying out the pyrolysis, they do show that there is a considerable difference in the relative rates at which the diol alkoxide and primary alkoxide decompose.

What is claimed is:
1. The method of removing secondary aluminum alkoxides from a mixture which comprises primary aluminum alkoxides and secondary aluminum alkoxides which method comprises heating the mixture to a temperature sufficiently high to decompose at least 93 weight percent of the secondary aluminum alkoxides in the mixture within a period of about one hour.
2. The method defined in claim 1 wherein said mixture is heated to a temperature of at least 300° C.
3. The method defined in claim 2 and further characterized to include the step of stripping the mixture following the thermal decomposition of the secondary aluminum alkoxides to remove aluminum free compounds therefrom.
4. The method defined in claim 3 wherein said mixture includes free alcohol, and wherein said method is further characterized to include the step of adding to said mixture before heating, an amount of an aluminum alkyl compound effective to retard thermal decomposition of said primary aluminum alkoxide relative to thermal decomposition of said secondary aluminum alkoxide during the heating of said mixture.
5. The method defined in claim 4 wherein said aluminum alkyl compound is selected from the group consisting of aluminum triethyl and aluminum diethyl hydride.
6. The method defined in claim 4 wherein an amount of at least 2 weight percent of said aluminum alkyl compound, based on the weight of the mixture, is added to said mixture.

References Cited
UNITED STATES PATENTS 3,116,310 12/1963 Barie et al. _____ 260—448
3,282,974 11/1966 Bruno et al. _____ 260—448
3,322,806 5/1967 Asinger et al. _____ 260—448
3,475,477 10/1969 Müller _____ 260—448

TOBIAS E. LEVOW, Primary Examiner
H. M. SNEED, Assistant Examiner